May 11, 1948.  F. W. KELLEHER ET AL  2,441,152
BALANCING DEVICE
Filed April 28, 1945  2 Sheets-Sheet 1
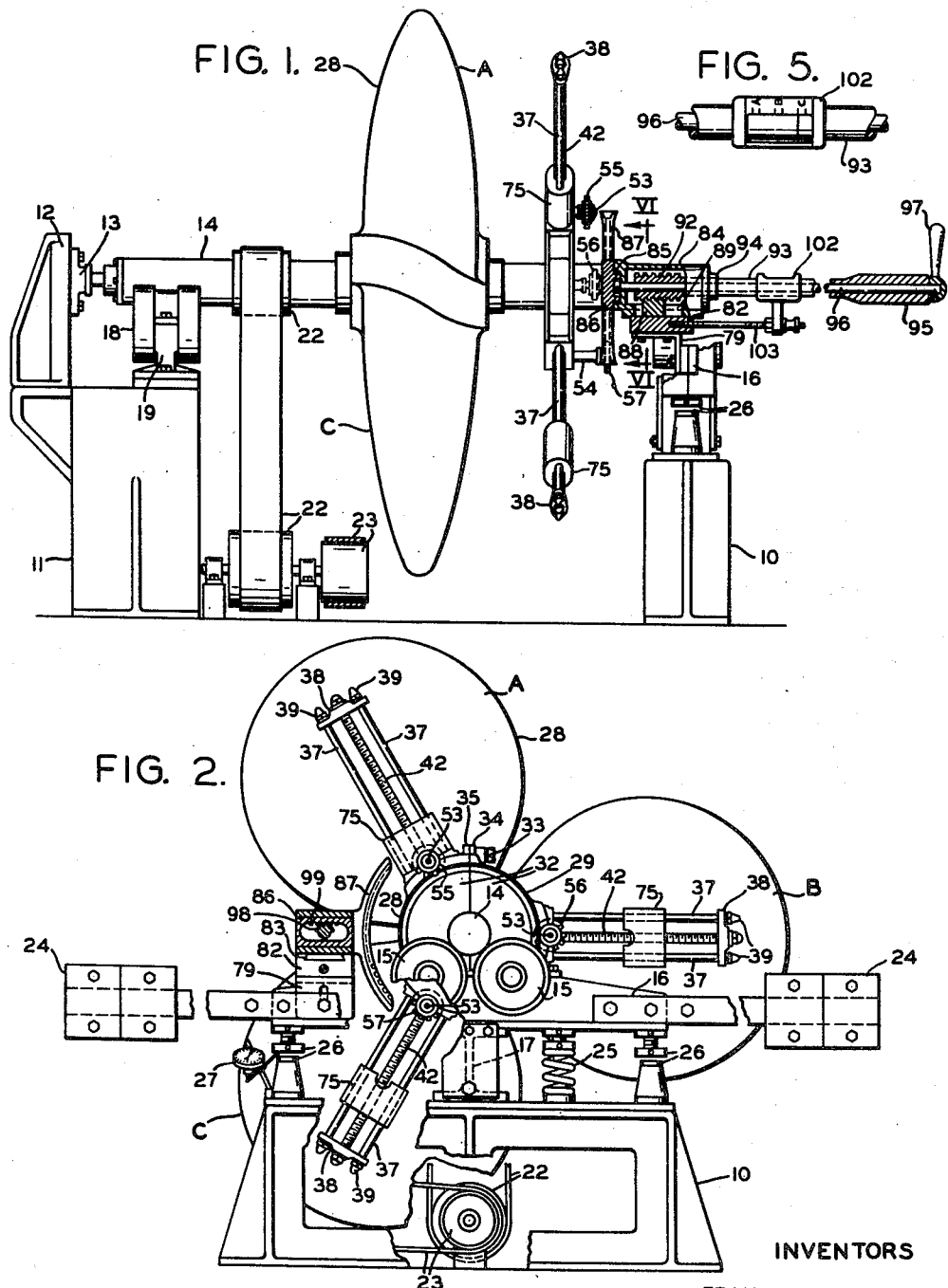
INVENTORS
FRANCIS W. KELLEHER
MARCUS H. GUILE
BY Ralph L. Chappell
ATTORNEY May 11, 1948.  F. W. KELLEHER ET AL  2,441,152
BALANCING DEVICE
Filed April 28, 1945  2 Sheets-Sheet 2
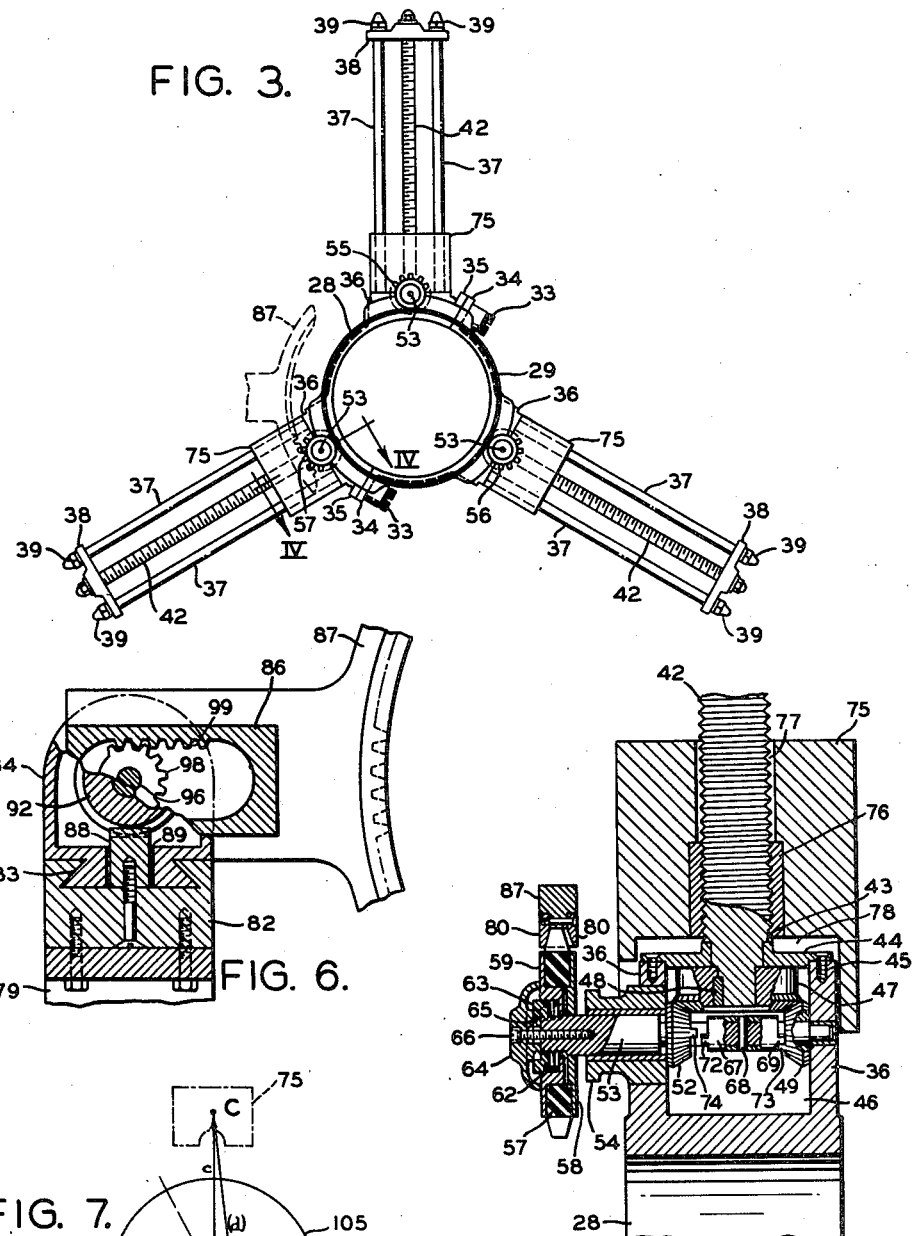
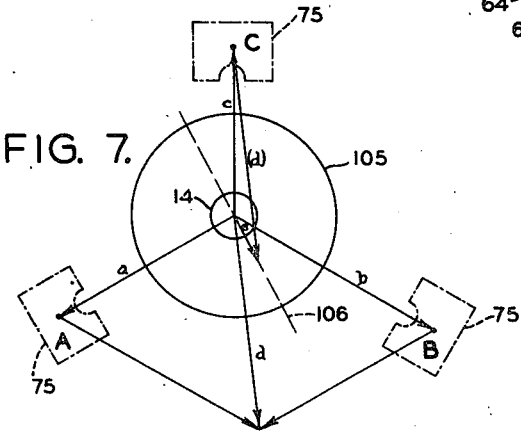
INVENTORS
FRANCIS W. KELLEHER
MARCUS H. GUILE
BY Ralph L. Chappell
ATTORNEY Patented May 11, 1948

2,441,152

UNITED STATES PATENT OFFICE 2,441,152

BALANCING DEVICE

Francis W. Kelleher, Lynn, and Marcus H. Gulle, Revere, Mass.

Application April 28, 1945, Serial No. 590,865

5 Claims. (Cl. 73—66)

(Granted under the act of March 3, 1883, as amended April 30, 1928; 370 O. G. 757)

This invention relates to methods of and machines for dynamically balancing rotating bodies, as for example, rotors, flywheels, propellers and the like. The invention in one aspect relates more particularly to improvements in a device to be used with such machines for facilitating the determination of the location and weight of substance necessary to be removed (or added) in order to bring a particular article to be balanced, as nearly as possible, into true dynamic balance. In another aspect, the invention provides an improved method of carrying out the above-mentioned procedure.

While for purposes of illustration, the invention will be described hereinafter with reference to the balancing of propellers, it will be understood that it is in no sense to be construed as limited thereto, but may also have application in the balancing of any rotating body, as above indicated.

A common type of balancing machine includes a fixed bearing supporting one end of a horizontally disposed arbor or shaft, the opposite end of which is supported on two juxtaposed rolls. The rolls are rotatably mounted centrally of a transversely extending vibrating beam that is hypersensitively balanced upon a centrally disposed fulcrum web. Conventional driving connections are provided between the shaft and a source of power that is suitably controllable to impart variable speeds to the shaft and a propeller that is mounted thereon for balancing. A dial indicator is operatively connected to the vibrating beam to register the amount of vibration thereof during, what are termed, "running" or "spinning" tests of the propeller. These tests are for the purpose of obtaining balancing readings. It is a usual practice to first make a trial "run" or "spin" to determine the critical or synchronous speed at which the maximum vibration occurs. This speed varies in accordance with the size and weight of the propeller. However, once the critical speed is determined for a specific propeller, all subsequent readings are taken at that speed. Having found the critical speed, a balancing device is mounted on the shaft for obtaining the indications of certain of the factors required in the computations made for plotting the location and determining the quantity of substance necessary to be removed from the propeller to bring it into balance.

The device heretofore used for this purpose includes a pair of radially extending arms, each arm being spaced 180° from the other, and carrying a weight screw-threaded thereon for manual adjustment radially of the shaft. The entire device is also adjustable about the circumference of the shaft into any desired position. The weights are of known, but unequal values, and may be adjusted to different relative positions on the arms so as to counteract unbalance in the propeller.

The balancing procedure is performed as follows:

With the device mounted on the arbor, the machine is run at the predetermined critical speed. By a trial and error method of making repeated manual adjustments, the two weights are moved away from their normal or neutral position (that is, with one weight adjacent to the inner end of its arm and the other weight at the outer extremity of its arm) until the minimum vibration of the beam is shown by the dial indicator. It is especially noted that, since the adjustment of the weights is performed manually, each time an adjustment is made the machine must be stopped. Further, it is noted that following any adjustment of the weights, the machine must be started and brought up to the critical speed before a new reading can be taken. In this manner, these trial and error adjustments are carried on until finally, the proper balance is obtained. Similar additional interruptions may also be involved in this procedure because it is often necessary to relocate the device circumferentially of the shaft several times to bring the plane of its arms into coincidence with the plane of unbalance. After completing each of these circumferential adjustments, the adjustments above described will again be made until a satisfactory balance reading is indicated.

The time consumed by this method of balancing varies in accordance with the weight of the propeller, the amount of unbalance and the skill of the operator. It has been found in practice, that even with a skilled operator, this balancing time runs generally from three to ten hours on a propeller of the 1000 to 17,000 pound class. When the vibration indicator shows that dynamic balance has been obtained, the distances that the weights have been moved from their neutral or home positions are measured. From these measurements and other established factors, the location and quantity of excess material to be removed to balance the propeller are computed and plotted on a diagram which indicates to a workman how the removal of material from the propeller is to be performed.

The delays caused by repeated stopping of the machine necessary for making the multiple adjustments of the balancing device on the shaft, and the manual adjustment of the weights on the arms, as well as by restarting the machine and waiting for it to attain the critical speed before taking the vibratory readings, accumulatively, protract considerably the time consumed in obtaining the data which is essential for making the balancing computations.

It is accordingly, an object of the present invention to provide a balancing device, the construction of which is such that it need be positioned only once circumferentially of the shaft for a particular balancing operation. A further object is to provide a device of this character in which any one of the weights can be moved selectively from a neutral position radially outwardly from or back toward its neutral position and ultimately into balancing position, while the propeller continuously rotates at the critical speed, whereby any necessity for stopping the machine and making the repeated adjustments of the device referred to above is obviated.

With these and other objects in view, the invention consists in certain novel features of construction and combinations of parts, which are set forth in appended claims, and a preferred embodiment of which is hereinafter described with reference to the drawings which accompany and form a part of the specification.

In the drawings:

Fig. 1 is a left side elevation of a balancing machine with an improved balancing device embodying the invention applied thereto, Fig. 2 is a front elevation thereof with certain parts broken away for clarity of illustration, Fig. 3 is a detailed front elevation of the improved balancing device showing the relation of the gears of the weight moving mechanism with respect to an arcuate rack for selectively operating them, Fig. 4 is a detailed cross sectional view taken on the line IV—IV of Fig. 3 showing the construction of the reversible clutch that governs the direction of rotation of the arms upon which the weights are threadedly mounted, Fig. 5 is a detailed plan view of a scale for indicating with which weight the weight controlling device is associated, Fig. 6 is a detailed sectional view of a slidable gear housing taken on the line VI—VI of Fig. 1, and Fig. 7 is a diagrammatical view showing how the position of the plane of unbalance is determined.

The balancing machine proper includes forward and rear (right and left Fig. 1) pedestals 10 and 11, respectively. The rear pedestal 11 supports a bracket 12 carrying a thrust bearing 13 to which the rear end of a horizontally disposed arbor or shaft 14 is connected. The shaft 14 is supported at its forward end between the upper surfaces of two juxtaposed rolls 15 (Fig. 2) rotatably mounted centrally on a transversely extending vibrating beam 16 that is delicately balanced for vibratory movement upon a centrally disposed fulcrum web or mounting 17 secured centrally on the forward pedestal 10. A pair of juxtaposed rolls 18 (Fig. 1), similar to the rolls 15, is rotatably mounted upon a frame 19 fixed on the pedestal 11 to further support the rear end of the shaft 14 for balance testing rotation. Conventional driving connections such as the belt and pulleys 22 are provided and are connected by a belt and pulley 23 with a source of power that is suitably controlled to impart variable speeds to shaft 14.

The beam 16 is of the usual design and construction provided in these machines and carries at its outer ends equalizing, balancing weights 24. Springs such as 25 (only one of which is shown) are equi-spaced from the fulcrum 17; and adjustable, vibration limiting stops 26 are provided between the springs 25 and weights 24.

A graduated dial indicator 27 (Fig. 2) is secured on the left side of the pedestal 10 and is arranged so that its feeler is in contact with the under surface of the outer portion of the left limiting stop 26 to register vibratory movement of the beam.

The propeller 28, to be balanced, is mounted substantially centrally on the shaft 14 between pedestals 10 and 11 as clearly shown in Fig. 1. In performing balancing operations, it is general practice to rotate the shaft and propeller and take readings of the indicator dial 27 to determine the critical or synchronous speed at which maximum vibration occurs. Once the critical speed is determined for a specific propeller, all subsequent readings of the dial indicator 27 are taken at that speed.

The device for indicating the factors entering into the computations necessary to determine the location and quantity of material to be removed from the propeller, in order to establish its true dynamic balance, will now be described. This device comprises a hub or clamp composed of two semi-circular parts 28 and 29 (Fig. 2) arranged to securely embrace corresponding two-part spacers 32 having a central bore of just sufficient diameter to snugly embrace the shaft 14 when the clamp and spacers are assembled on the shaft and the clamp is drawn tight as shown in Fig. 2. The purpose of this construction is to enable the parts 28—29 to be used in connection with shafts of varying diameters. That is, spacers having bores of varying sizes to accommodate diameters of different shafts, but having the same outer diameter as the inner diameter of the parts 28—29, are provided for this purpose. The parts 28—29 are secured together in assembled relation by screws 33 passing through flanges 34 formed on the part 29 and threadably engaging in corresponding flanges 35 formed on the part 28 of the clamp.

Three seats or bosses 36 (Fig. 3), equi-spaced, 120° one from another, are formed integrally on the periphery of the composite clamp. Each of these bosses carries a pair of radially extending, spaced, parallel, guide rods 37 connected at their outer ends by a tiebar 38 spanning the rods and secured thereon by nuts 39. A threaded rod or arm 42 is centrally disposed between each pair of rods 37 and extends parallel thereto, the upper end of the arm being journaled for rotation in the tiebar 38. The lower end of each arm 42 (Fig. 4) is shouldered as at 43 to rotatably seat upon a cap 44 secured by screws 45 across a gear chamber 46 provided centrally in each boss 36. The lower reduced end of each arm 42 extends through the cap 44 into the chamber 46 and has secured thereon by a key, such as 48, a beveled gear 47. Each gear 47 meshes with oppositely disposed, beveled, pinions 49 and 52 mounted for free rotation upon a horizontally disposed shaft 53 journaled at its opposite ends in bushings provided in the side walls of the chamber 46.

The forward end (left as viewed in Fig. 4 and right as viewed in Fig. 1) of each shaft 53 extends outwardly through a collar 54 and these forward ends are of different lengths for a purpose to be later described. The outer end of each shaft carries a driving gear of yielding rubber material, the gears for the different shafts being indicated at 55, 56, and 57. The mounting of the gears on the shafts 53 and the connections between the latter and the arms 42 are the same in all instances, and will be described below with reference to the gear 57 and the mechanism associated therewith.

As indicated in Fig. 4, the gear 57 is arranged to be received between oppositely disposed recesses provided in flanged disks 58 and 59, the disk 58 being rigidly secured to the shaft 53. The thickness of the gears is such that when disk 59 is placed in the position shown in Fig. 4 so that its flange embraces the body portion of the gear, clearance is provided between the inwardly projecting face of a cupped portion formed in disk 59 and the inner surface of disk 58. A nut 63 threaded on the outer end of the shaft 53 is adjustable inwardly thereon against a helical friction spring 62 placed within the cupped portion of disk 59 to provide a frictional drive between the nut and the internal surface of the cupped portion. Spring 62 serves also to yieldingly press disk 59 toward disk 58 to securely hold gear 57 between the flanges of the disks and still permit of frictional slippage. When nut 63 has been adjusted in position to obtain the proper degree of pressure for the assembly, a cap 64 having a centrally disposed key 65, of sufficient length to span a slot in nut 63 and a corresponding slot in the extreme left end of shaft 53, is mounted in locking position in the slots by a screw 66 passing through the cap and threaded into shaft 53.

A clutch member 67 is secured by a pin 68 to the shaft 53 between the pinions 49 and 52. Outwardly projecting teeth 69 and 72 provided on the opposite ends of the member are arranged to be alternately engaged with and disengaged from corresponding inwardly projecting teeth 73 and 74, respectively, when the shaft 53 and the clutch member 67 are moved longitudinally by a mechanism to be later described. When the shaft 53 is in the rightward position shown in Fig. 4, the companion teeth 69 and 73 are engaged and the teeth 72 and 74 are disengaged; and when the shaft 53 and the clutch member 67 are shifted forwardly or, to the left as viewed in Fig. 4, the teeth 69 and 73 will be withdrawn from engagement as the companion teeth 72 and 74 are brought into engagement.

By the foregoing construction, there is provided a reversible clutch mechanism for each unit of the device that is operable upon imparting a slight longitudinal movement to shaft 53, to establish a driving connection between the gear 47 and either of the pinions 52 and 49 whereby the arm 42 may be rotated in either direction at will.

A weight 75 is mounted on each arm 42 for adjustment therealong away from and toward shaft 14. The weights are threadably mounted on the arms by bushings 76 (Fig. 4) fixed within bores 77 extending centrally from end to end through each weight, the diameters of the bores being sufficient to clear the threads. The weights are each also provided on opposite sides of the central bores with lengthwise extending bores that slidably embrace the rods 37 (Figs. 2 and 3) which serve to guide the weights during their movement along arms 42. A recess such as 78 (Fig. 4) is provided in that end of each weight that lies nearest shaft 14, the recesses being of such size and shape as to accommodate with clearance the bosses 36 when the weights occupy their neutral or home positions adjacent to the bosses at the commencement of a balancing operation.

The centers of the shafts 53 are equidistant radially from the center of shaft 14. However, as previously described, the forward ends of shafts 53 are of different lengths and hence the gears 55, 56, and 57 travel in separate orbits of the same diameter but spaced from each other axially of the shaft as clearly shown in Fig. 1.

The mechanism for selectively rotating the gears 55, 56, and 57 as they travel around shaft 14 will now be described. This mechanism is supported upon an upstanding bracket 79 fixed on the beam 16 to the left of web 17 and includes a block 82 fixed on the bracket and having a dovetailed way 83 (Figs. 1 and 6) in which is mounted for slidable movement longitudinally of the machine a gear housing 84. The left end of housing 84 has a dovetailed way 85 supporting a slide 86 for movement transversely of the housing. Slide 86 carries on its inner end an arcuate rack 87 movable into and out of mesh with gears 55, 56, and 57.

A short rack 88, having teeth on its upper surface, is secured centrally on the top of block 82 and projects upwardly through an elongated slot 89 in the base of housing 84 into mesh with a worm 92. The worm 92 is supported in the housing on the left end of a horizontally disposed hollow tube or sleeve 93, journaled for rotation in a bearing 94 secured on the right end of the housing 84. The right end of the sleeve 93 has a knurled handle 95 which may be grasped by the operator to rotate the sleeve and, through the worm and rack connection just described, move the rack 87 into, or out of, the plane of the orbit of any one of the gears 55, 56, or 57.

Within the sleeve 93 there is rotatably mounted a rod 96 movable longitudinally with the sleeve and carrying at its projecting right end a lever 97, and at its projecting left end a segmental pinion 98 meshing with a set of internal rack teeth 99 formed in the dovetailed section of slide 86. Upon a slight movement of lever 97 clockwise, pinion 98 moves slide 86 and rack 87 from the full line position shown in Fig. 2 to the dotted line position indicated in Fig. 3. Thus, the rack 87 is moved into meshing relation with that one of the gears 55 or 56 or 57 into the plane of which the rack 87 has been adjusted by rotation of handle 95, as above described. Rack 87 may at any time be withdrawn from meshing engagement with a gear by turning the lever 97 in a counter-clockwise direction to move the rack 87 from the dotted line position of Fig. 3 back into the full line position of Fig. 2.

A scale 102 (Fig. 1) is secured by a rod 103 to block 82. This scale bears suitable indices "A," "B," and "C," for indicating where the rack 87 must be moved axially of the shaft 14 to bring it into the plane of one of the gears 55, 56, or 57. For example, when the sleeve 93 has been adjusted to bring a single line inscribed on its periphery opposite to one of the "A" indices, the rack 87 is positioned so as to engage only the gear 55. That blade of the propeller nearest to the weight 75 which is adjusted by operating the gear 55 is designated as the "A" blade of the propeller.

The purpose of the closely spaced, dual indices on the scale 102 is to indicate the amount of longitudinal movement of sleeve 93 necessary for reversing the position of the clutch element 67 of the particular "A," "B," or "C" unit, the driving gear of which then is in position to be engaged by the arcuate rack 87.

Referring to Fig. 4, it is seen that the teeth of the gears 55, 56, and 57 are beveled on their opposite sides, that the internal walls of the rack 87 are correspondingly beveled forming side flanges 80, and that the teeth are receivable between the flanges with a slight lateral clearance. By shifting the rack 87 longitudinally a slight amount in either direction this clearance is taken up and the gear, its shaft 53, and clutch member 67 are moved a distance sufficient to shift the clutch member and reverse the direction of rotation of shaft 42 as hereinbefore described. Such reversal of the rotation of the shaft 42, in turn, reverses the movement of its corresponding weight 75 radially of the shaft 14, as previously described.

The frictional mounting of the gears 55, 56, and 57 between the disks 58 and 59 and the frictional slip clutch arrangement between nut 63, spring 62, and the cupped portion of disk 59 is provided so that when a weight 75 is moved to its home or neutral position wherein it abuts the corresponding boss 36, the slippage permitted at either one or both of these points will thereafter prevent injury to the parts if the rack 87 is permitted to remain in driving relation with one of the driving gears.

In performing a balancing operation, the critical speed of shaft 14 and the propeller 28 to be balanced is first found by making test "runs" or "spins" and determining the speed at which the maximum vibratory fluctuation of indicator 27 occurs. The device is then clamped upon the shaft 14 with one of the arms 42 in alignment with the longitudinal axis of one of the blades of the propeller as indicated in Fig. 2. The machine is then again brought up to the critical speed. While it is thus running, the handle 95 is rotated to bring the indicating line on the sleeve 93 into registration with the left line (Fig. 5) of that pair of lines opposite to the character "A" on the indicator 102, to move the rack 87 into the plane of the gear 55 lying opposite to the "A" propeller blade. The lever 97 is then moved to shift the rack 87 into the orbital path of the gear 55 whereupon, during each revolution of the gear about shaft 14 it meshes with the rack and rotates the arm 42 associated with the gear in a direction to move its corresponding weight 75 outwardly along the arm.

If this movement of the weight should indicate an increase of vibration on the indicator 27, the handle 95 is turned to bring the indicating line on the sleeve 93 into registration with the rightward line (Fig. 5) of the pair opposite the character "A" on scale 102. This slight movement causes the gear 55 and its associated reversible clutch member 67 to move a short distance toward the right (Fig. 1) and reverse the direction of rotation of arm 42 to return the corresponding weight 75 to its neutral or home position. The lever 97 is then moved to withdraw rack 87 out of the orbital path of gear 55.

If it had been found that the above-described movement of the weight 75 outwardly had reduced the fluctuations of the indicator 27, the lever 97 would have been operated when maximum improvement was shown by the indicator to withdraw the rack 87 out of the path of the gear 55 and to leave the weight 75 at that position.

The above operations are performed individually, in connection with each gear 55, 56, or 57 corresponding to the blades "A," "B," and "C" while the machine continues in motion, the corresponding weights either being left in their moved position wherein they indicated improvement in dynamic balance or returned to their neutral or home position when opposite readings were shown on indicator 27.

In this manner, while the machine is in motion and without interruptions, the weights may be selectively adjusted away from, or toward the shaft 14 with considerable speed and accuracy until the vibratory indications on the indicator show that true dynamic balance has been attained.

The order in which the rack 87 shall be brought into operative connection with the gears 55, 56, or 57 is arbitrary.

If desired, to shorten the weight adjustment procedure, when the first movement of any weight causes an increase of unbalance, the rack 87 may be immediately withdrawn from actuating position with respect to the gear 55, 56, or 57 controlling that weight, and the weight may be left in its new position thereby saving the time required to restore the weight to its neutral position. In this case, the other weights are merely moved far enough to compensate for the increased unbalancing effect created by the movement of the first weight. When using this method, the reversible clutch members 67 are used only to restore the weights to their neutral or home positions before commencing operations on the next body to be dynamically balanced on the machine.

Once a condition of perfect dynamic balance has been established by adjustment of the weights 75, it may be said that they, altogether, exert a single centrifugal force of a certain magnitude and direction which exactly counteracts the unbalance in the propeller. This force may be determined as will be explained below. After the above-mentioned balancing operation has been completed for one end of the shaft and propeller, they as a unit are turned end for end in the machine, and a second centrifugal force of definite magnitude and direction is similarly determined which exactly compensates for the unbalance of the propeller in the second position. These two forces constitute a centrifugal couple acting about the center of gravity of the propeller, which, considering the propeller alone, would exactly compensate for its unbalance. Usually these individual forces are exerted in different planes, which are the respective planes of unbalance of the propeller for each "end" thereof. By the use of well-known principles of mechanics, this couple is resolved into a centrifugal moment, from which is computed how much, and where, material must be removed from or added to the propeller to bring it into dynamic balance. The application of the present invention to the above-mentioned well-known procedure resides in the initial determination by the use of the illustrated balancing device, of each centrifugal force and its direction, that is, the position circumferentially of the shaft of the plane of unbalance.

Reference will now be made to Fig. 7 which diagrammatically represents the balancing device with its weights 75 adjusted to different positions, away from their "home" positions represented by the circle 105, so as to bring a hypothetical propeller associated therewith into dynamic balance. Each weight exerts a centrifugal force, outwardly in the direction of its supporting arm 42 equal to $$\frac{Ww^2R}{g}$$

in which W is the weight of each weight 75, $w$ is its angular velocity, R is the radial distance between its center of gravity and the axis of the shaft 14, and $g$ is the acceleration owing to the effect of gravity. Since the quantity $$\frac{Ww^2}{g}$$

is the same for all weights, regardless of their position, the centrifugal force exerted by the weights is proportional to the respective quantities R. Accordingly, the vectors, $a$, $b$ and $c$, in Fig. 7 extending from the axis of the shaft 14, to the center of gravity of each weight A, B, and C, respectively, represent in any appropriate units, the relative centrifugal forces exerted by the weights when rotated. Altogether, the three centrifugal forces can be regarded as being equivalent to one resultant force which may be determined graphically, as illustrated in Fig. 7 by the use of the well-known parallelogram of forces. The vectors $a$ and $b$ may be resolved into their resultant $d$ which, when combined with vector $c$, yields a final resultant $e$, the latter in size and direction being the equivalent of the separate vectors $a$, $b$, and $c$. It is now apparent that the position of the vector $e$ corresponds to that of the plane of unbalance (indicated by the dash line 106) of the propeller, as to that end of it which was brought into balance by moving the weights to the positions indicated. Thus, in the use of the illustrated device, the plane of unbalance can be ascertained without requiring the device to be adjusted circumferentially of the shaft, merely by determining the resultant of the forces created by the three adjusted weights 75.

If in the use of the present three-arm device, the movement of one of the weights outwardly on its arm 42 increases the vibratory readings, the operator at once knows that the plane of unbalance is located within the scope of one or both of the other arms. The operator then may simply make all further adjustments of the weights on either or both of the two remaining arms 42. This feature alone of the illustrated device effects a considerable saving of time in balancing operations since it eliminates the repeated trial and error adjustments circumferentially of the shaft which the prior two-arm device required.

It has been found in practice that by the use of this device that the "spinning" or "running" time necessary to dynamically balance a propeller is reduced on the average by approximately 80%.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

The invention described herein may be manufactured and used by or for the Government of the United States of America for government purposes without the payment of any royalty thereon or therefor.

What we claim is:

1. In a balancing machine having a rotating shaft adapted to support a body to be dynamically balanced, a balancing device adapted to be mounted on the shaft with the body, said device comprising a radially extending arm, a weight mounted for adjustment along said arm to compensate for the unbalance of the body, mechanism for adjusting said weight comprising a screw on which said weight is threaded, a gear mounted upon said balancing device, said gear describing an orbital path upon the rotation of said balancing device, and reversible connections between said screw and gear for causing said weight to be moved in either direction on said arm by rotation of said screw in response to rotation of said gear and said balancing device in one direction, and a rack movable into and out of the orbital path of said gear for causing the latter to be rotated in response to the rotative movement of said device.

2. In a balancing machine having a rotating shaft adapted to support a body to be dynamically balanced, a balancing device adapted to be mounted on the shaft with the body, said device comprising a radially extending arm, a weight mounted for adjustment along said arm to compensate for the unbalance of the body, mechanism for adjusting said weight comprising an axially movable gear and reversing means actuated by axial movement of said gear to cause said weight to be moved in either direction on said arm in response to rotation of said gear in one direction, a rack by which said gear is driven in response to rotative movement of said device, said rack having flanges adapted to be engaged by the sides of said gear, means for moving said rack and gear axially of said gear to actuate said reversing means, and means for moving said rack radially of said shaft into and out of meshing relation with said gear.

3. In a balancing machine having a rotating shaft adapted to support a body to be dynamically balanced, a balancing device adapted to be mounted on the shaft with the body, said device comprising at least three radially extending arms spaced at equal angles from one another, a weight on each arm mounted for adjustment therealong to compensate for the unbalance of the body, means associated with each weight for adjusting it, each of said means comprising a driving element mounted to rotate about its own axis, said elements being spaced from one another axially of said shaft whereby said elements are moved in separate orbits when said shaft is rotating, and means for rotating said elements about their own axes in response to their orbital movement, said means being mounted for movement axially and radially of said shaft into and out of operative relation with any one of said elements.

4. In a balancing machine having a rotating shaft adapted to support a body to be dynamically balanced, a balancing device adapted to be mounted on the shaft with the body, said device comprising at least three radially extending arms spaced at equal angles from one another, a weight on each arm mounted for adjustment therealong, means including a gear associated with each arm for adjustably moving its weight therealong, said gears being equally spaced radially from the shaft but offset one from another axially thereof so as to define separate orbital paths as they move around with the shaft, and a rack mounted for movement axially and radially of the shaft into and out of mesh with any one of said gears.

5. In a balancing machine having a rotating shaft adapted to support a body to be dynamically balanced, a balancing device adapted to be mounted on the shaft with the body, said device comprising at least three radially extending arms spaced at equal angles from one another, a weight on each arm mounted for adjustment therealong, means including a gear associated with each arm for adjustably moving its weight therealong, said gears being equally spaced radially from the shaft but offset one from another axially thereof so as to define separate orbital paths as they move around with the shaft, a rack mounted for movement axially and radially of the shaft into and out of mesh with any one of said gears, and operator controlled members for selectively shifting the rack in its axial or radial movements.

FRANCIS W. KELLEHER.
MARCUS H. GUILE.

REFERENCES CITED

The following references are of record in the file of this patent:

UNITED STATES PATENTS

| Number | Name | Date |
|---|---|---|
| 1,296,732 | Akimoff | Mar. 11, 1919 |
| 1,610,487 | Brinton | Dec. 14, 1926 |
| 1,739,105 | Trumpler | Dec. 10, 1929 |
| 2,160,314 | Ongaro | May 30, 1939 |
| 2,336,429 | Wenger | Dec. 7, 1943 |